United States Patent [19]
Monticello

[11] Patent Number: 4,982,797
[45] Date of Patent: * Jan. 8, 1991

[54] TAPE FOR HOOF REPAIR

[76] Inventor: Samuel A. Monticello, 6600 S. Lake St., Lake Charles, La. 70605

[*] Notice: The portion of the term of this patent subsequent to Apr. 17, 2007 has been disclaimed.

[21] Appl. No.: 468,110

[22] Filed: Feb. 20, 1990

Related U.S. Application Data

[63] Continuation of Ser. No. 230,611, Aug. 10, 1988, Pat. No. 4,917,192.

[51] Int. Cl.$^5$ .................................................. A01L 15/00
[52] U.S. Cl. ........................................... 168/4; 168/17
[58] Field of Search ................. 168/17, 4, DIG. 1, 22, 168/27

[56] References Cited
U.S. PATENT DOCUMENTS

| | | | |
|---|---|---|---|
| 492,460 | 2/1893 | Crannell | 168/17 |
| 3,285,346 | 11/1966 | Jenny et al. | 168/4 |
| 3,302,723 | 2/1967 | Renkenberger et al. | 168/DIG. 1 |
| 3,470,960 | 10/1969 | Masone | 168/DIG. 1 |
| 3,486,561 | 12/1969 | Kulak | 168/16.1 |
| 3,664,428 | 5/1972 | Spencer | 168/4 |
| 3,782,473 | 1/1974 | Spencer | 168/4 |
| 3,921,721 | 11/1975 | George | 168/17 |
| 4,013,126 | 3/1977 | Spencer | 168/17 |
| 4,036,302 | 7/1977 | Spencer | 168/17 |
| 4,265,314 | 5/1981 | Tovim | 168/4 |
| 4,667,661 | 5/1987 | Scholz et al. | 128/90 |

Primary Examiner—Paul J. Hirsch
Attorney, Agent, or Firm—Barnes & Thornburg

[57] ABSTRACT

A method is provided for securing a horseshoe to a hoof by wrapping a curable resin coated sheet material around an applied horseshoe and at least a portion of the hoof after the cure has been initiated, such that the resin coated sheet material secures the horseshoe to the hoof. An apparatus is also provided for securing a horseshoe according to the method.

11 Claims, 2 Drawing Sheets

TAPE FOR HOOF REPAIR

This is a continuation of application Ser. No. 07/230,611, filed Aug. 10, 1988 now U.S. Pat. No. 4,917,192.

BACKGROUND AND SUMMARY OF THE INVENTION

A method and apparatus are provided for applying a horseshoe to the hoof of an animal.

It is difficult to repair a cracked hoof using conventional therapeutic horseshoes. Many times problems arise in securing the horseshoe to the cracked hoof. The horseshoe is used to immobilize and stabilize the hoof wall structure. (However, with severely damaged hooves, the shoe cannot be adequately secured until the defect has grown out solidly from the coronet to a point where conventional methods of securing a horseshoe can be employed successfully.)

Another situation is a hoof which is in poor condition and does not provide a secure anchor for conventionally applied horseshoes. Thus, in hooves in such poor condition, shoes are often lost when secured using conventional methods.

A problem associated with surgery on the distal limb of a horse, is contamination from the hoof area. In spite of conventional diligent efforts to scrub a hoof before surgery including the use of overnight antibacterial impregnating dressings, the hoof is still a source of substantial contamination during surgery.

An object of the present invention is to provide an improved method and apparatus for securing horseshoes to the hoof of an animal. A further object is to provide a superior horseshoe securing method and apparatus for treating a damaged hoof for purposes of repair to the damaged hoof.

Another object of the present invention is to provide an improved method and apparatus for applying a horseshoe to a weakened hoof wall in which conventional nailing may be insufficient.

A further object of the present invention is to provide an improved method and apparatus for substantially reducing bacterial contamination from the hoof during surgical procedures.

Yet another object of the present invention is to provide a unique molded horseshoe and method and apparatus for securing the same to the hoof of an animal.

These objects and other objects are achieved by a method for securing a horseshoe to a hoof which includes applying a horseshoe to the bottom of a hoof, initiating the cure of a curable resin coated sheet material and wrapping the curable resin coated sheet material around the horseshoe and the hoof. The cured resin coated sheet material secures the horseshoe to the damaged hoof even in situations where the hoof is damaged by a crack or the hoof is generally weak or in poor condition. Once the horseshoe is secured to the hoof, the hoof can grow out and repair its own defect.

According to advantageous features of certain preferred embodiments of the invention, the applying of the horseshoe includes using elements to prevent movement of the horseshoe relative to the hoof before and during wrapping and curing of the resin sheet material. It is contemplated that these elements also provide an additional securing mechanism for securing the horseshoe to the hoof. In certain preferred embodiments, these securing elements are nails which nail the horseshoe to the hoof.

According to other advantageous features of certain preferred embodiments of the invention, a crack of the hoof is filled with a hardenable hoof repair material after applying a horseshoe to the hoof and before wrapping the curable resin coated sheet material around the horseshoe and the hoof. In these embodiments, the hardenable hoof repair material aids in the stabilization of the hoof while the shoe effectively immobilizes and stabilizes the hoof wall structure. The secured shoe is effectively secured by the cured resin coated sheet material, and any other attachment elements, such as nails, if used. In certain embodiments, the hoof repair material is a settable acrylic material.

According to other advantageous features of certain preferred embodiments of the invention, a shoe is used which includes an anchor extending out from the hoof around which the curable resin coated sheet material is wrapped and secured.

An apparatus is also provided which includes a horseshoe, and cured resin coated sheet material wrapped around the horseshoe and the hoof thereby securing the horseshoe to the hoof.

According to other advantageous features of certain preferred embodiments of the invention, a method is provided for substantially reducing the chance of contamination of the lower leg area as a result of contamination from the hoof which often is a large source of contamination. This method includes wrapping a curable resin coated sheet material around the hoof and curing the resin coated sheet material.

According to other advantageous features of certain preferred embodiments of the invention, a method is provided for molding a horseshoe from curable resin coated sheet material and thereafter securing the molded shoe to the hoof by wrapping curable resin coated sheet material around the molded horseshoe and the hoof.

These and other objects, features and advantages of the present invention will become apparent from the following description when taken in connection with the accompanying drawings which show, for the purposes of illustration only, plural embodiments in accordance with the present invention.

DETAILED DESCRIPTION OF THE DRAWINGS

Figure 1:
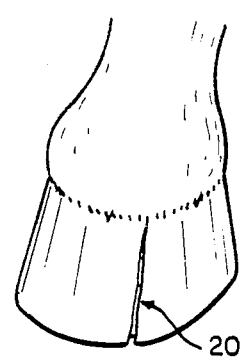
FIG. 1 is a schematic view of a full length toe crack in a hoof.
Figure 2:
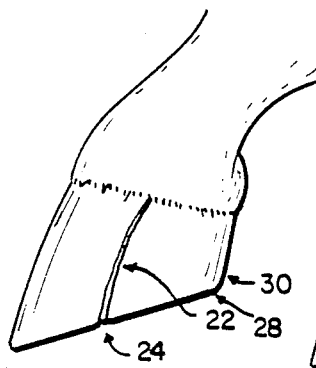
FIG. 2 is a schematic view of a quarter crack in a hoof.

FIG. 1 schematically shows a toe crack 20 in a damaged hoof. FIG. 2 shows a quarter crack 22 of a damaged hoof. The cracks shown in FIG. 1 and 2 are but two examples of damaged hoofs which can be repaired using the present invention. Several other types of damaged hooves can also be repaired using the present invention.

The hoof is first trimmed and prepared for shoeing in the conventional manner. Extra care should be taken to clean the hoof wall and sole 24 with a wire brush to remove all dirt and extraneous organic material from the wall and sole area to the coronet 26. The area cleaned should include the complete circumference of the hoof, particularly the heel 28 and bulb area 30.

Figure 3:
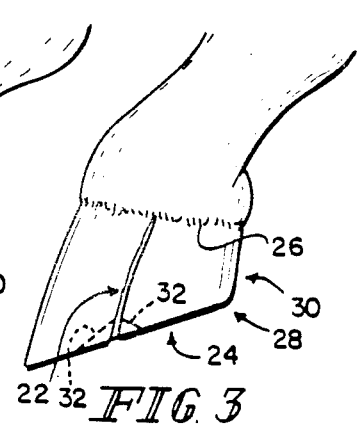
FIG. 3 is a schematic view of the area adjacent a crack of the hoof to be trimmed away.
Figure 4:
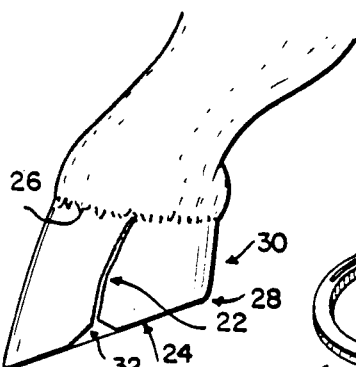
FIG. 4 is a schematic view of the hoof after the area adjacent to the crack has been trimmed away.

As shown in FIG. 3, an area shown by dotted line 32 adjacent to the crack should be trimmed away to relieve the stress of weight bearing in this area. In certain preferred embodiments, the area trimmed away should be approximately one-quarter inch measured from the sole. FIG. 4 shows the cracked hoof with the area 32 trimmed away.

After the hoof is properly trimmed and prepared for application of a shoe, the hoof crack 22 is pared out on both sides of the vertical defect until healthy horn tissue is reached. The edges are then undermined with a high speed router bit along the entire length of the defect (from proximal to distal extremity). If, during this part of the procedure, any bloody or necrotic tissue is revealed, these lesions should then be curetted to normal healthy tissue, and packed with tincture of thimerosal daily until the areas are hardened and dry. This additional procedure, in the event of lesions, usually takes a few days.

Figure 5:
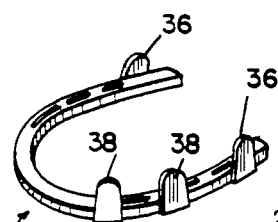
FIG. 5 is a schematic view of a horseshoe according to certain preferred embodiments prior to application to the hoof.
Figure 6:
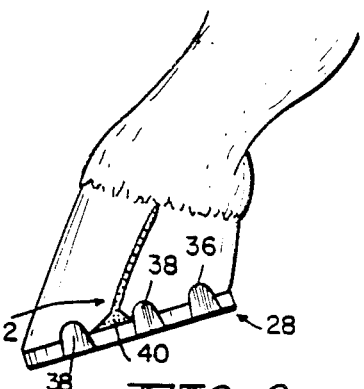
FIG. 6 is a side view of the horseshoe of FIG. 5 applied to the hoof.

With a hardened, dry excavated area with which to work, the hoof is ready for shoe application. According to certain preferred embodiments, an example of a shoe which can be applied, is shown schematically in FIG. 5. The shoe 34 can include clips 36, 38 (thin metal wedges drawn from the edge of the shoe). In certain preferred embodiments, clips 36 are provided on both sides of the shoe at the branches of the shoe, which are placed toward the heel of the hoof. In certain preferred embodiments, clips 38 are also provided which are to be disposed on both sides of the crack to be fixed. The clips on the shoe aid in immobilizing and stabilizing the hoof wall structure. FIG. 6 shows an example of the shoe shown in FIG. 5 applied to the hoof.

The shoe should be applied to the hoof such that movement thereof is prevented. Thus, the applied shoe should not be subject to movement in an horizontal plane relative to the hoof, or axially away from the hoof. In a particularly preferred embodiment, this application of the shoe to prevent movement is performed by nailing the shoe in place. Although the attachment elements and methods should not be limited to any particular type, other contemplated methods of applying the shoe prior to wrapping include the use of clips or chemical bonding material.

Once the shoe is nailed in place, the crack defect 22 is filled with a hard acrylic hoof material 40 as shown in FIG. 6. The hard acrylic hoof material is allowed to set, and then is rasped to a rough finish so that the filled defect is on the same plane as the adjacent medial and lateral surfaces of the hoof wall. The hoof wall is then painted with acetone to further clean the surface of any organic matter. This painting step also insures a better bond between the curable resin coated sheet material and the hoof wall.

The hoof and shoe are then ready for the wrapping of the curable resin coated sheet material or fiberglass sheet or tape. Resin coated sheet material suitable for the present invention can include several available resin coated fiberglass sheet materials. One particularly suitable water activated, resin coated sheet material is marketed under the trademark STOP IT which is used for industrial repair of leaks in pipe materials. The material safety data sheet for the STOP IT material lists fibrous glass, urethane prepolymer, modified 4-4' diphenylmethane, diisocyanate-(MDI), amine catalyst, acid chloride, antioxidant, antifoam and lubricant as components.

A brochure of the STOP IT material lists U.S. Pat. No. 4,667,661 to Scholz et al. The examples of materials shown in the Scholz et al patent are described for orthopedic bandage casts. According to the present invention, these materials can also be useful for securing horseshoes to the hoof. All of the material components of the Scholz et al patent are hereby incorporated by reference. However, other curable resin coated materials can be used and thus the present invention should not be limited to those materials in the Scholz et al patent. The materials should always have a heat of reaction less than temperatures that would be deleterious to the animal. Certain materials contemplated are various known acrylics, expoxy resins and other fiberglass resins.

These materials, such as the STOP IT material, not only provide a mechanical attachment of the horseshoe to the hoof, but also actually adhere and bond to the hoof. This material is also advantageous, in that it is provided with a lubricant and thus the surface is not tacky when manipulated with a hand or tool. Further, this particular material can harden under water. Thus, this material as used in the present invention provides not merely a cast or immobilizing structure for surrounding the shoe and the hoof, but rather provides an adhering bond to secure the shoe to the hoof.

The procedure for wrapping the curable resin coated sheet material will now be discussed. The hoof should be placed on a hoof stand to rest the hoof while applying the material. A bucket of water should be provided for immersing the resin coated material. The operator should wear a pair of rubber gloves during the procedure. Variations in the exact methodology are available a dictated by changes in location of the crack, disposition of the patient and the talent and dexterity of the operator.

Figure 7A:
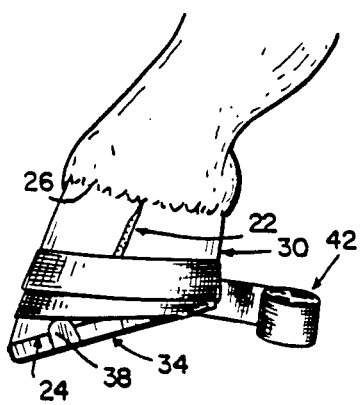
FIGS. 7a–c schematically show the steps of wrapping the curable resin coated sheet material around the damaged hoof and shoe.

Once the hoof is placed on the hoof stand, an assistant should hold the hoof steady. With gloved hands, the container pack is torn open and the roll of resin coated material 42 is removed and immersed in water for about 5 to 10 seconds to activate the resin material. The roll 42 is removed from the water and immediately wound firmly around the hoof. The material should cover the hoof wall about ¾ of the distance from the sole 24 to the coronet 26. Care should be taken in the palmar (or plantar area) so as not to create excessive pressure in the tender bulb areas. Rather, the tape should be built up across the heel and in branches of the shoe as shown in FIG. 7a. If the wall of the heel is not sufficient in height to enclose in a total wrap, then the area can be padded with a thin layer of felt to protect the bulb and soft tissues.

Figure 7B:
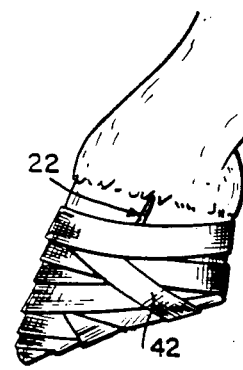
Figure 7C:
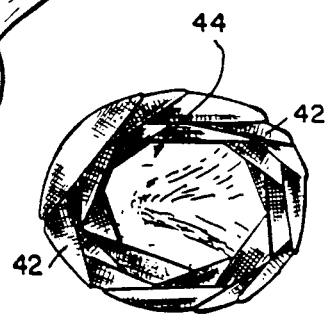
Figure 8:
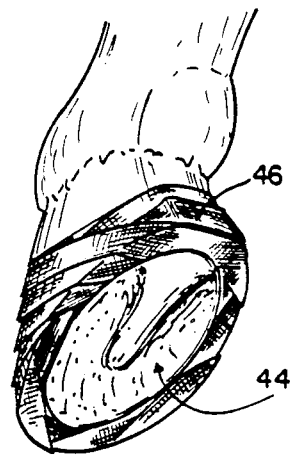
FIG. 8 is a schematic view of the cured resin coated sheet material securing the shoe to the hoof after excess cured resin coated sheet material has been removed.

In Winding the roll around the hoof, the shoe should be incorporated into the material such that the build up of material will evenly cover the side wall of the hoof, as well as the sides and weight bearing surface of the shoe as shown in FIGS. 7b, 7c and 8. The wrapping should be weaved back and forth to cover all of the described areas in a woven pattern as shown in FIG. 7b. Thus, the wrap should not be done in the same direction and plane. The winding is done with moderate pressure so as to create a tight arrangement of the material around the hoof and shoe, covering the wall and sole tightly. During the winding process, the foot position on the hoof stand can be changed from time to time to accommodate the areas of wrapping.

During the process, the operator will note that the material becomes warm to the touch, indicating the heat of reaction while curing. This is a normal reaction, and the elevated temperature does not customarily cause discomfort to the horse. Should the temperature become elevated enough to cause discomfort to a highly sensitive horse, cold water can be applied to the material without interfering with the curing process. Clinically, the heat produced in the curing is not as high with the STOP IT brand material as that produced by the hard acrylic hoof material curing. The latter has been used for over two decades without deleterious effects of excessive temperatures. The same acrylic material used in the hoof has also been used in teeth sockets without any deleterious effects. Thus, the lesser heat producing resin curing process of the STOP IT brand material does not present a thermal problem.

As discussed above, any curable resin material which has a heat of curing less than temperatures which may harm the horse can be used in the present invention. Thus, the present invention should not be limited to the STOP IT material. Although the lubricant in the STOP IT materials is advantageous, it is not mandatory for use in the present invention. Therefore, other conventional curable resin coated sheet materials can be used in the present invention.

The resin of the material will foam up through the fiberglass tape during the wrapping procedure. Once the wrapping procedure is finished, this foam should be rubbed firmly and smoothly over the repaired surface area in order to produce an attractive finish which is similar to the surface of PVC piping. This rubbing also creates a better bond between the resin material and the hoof when the resin material is cured. Wrapping normally takes between one and two minutes to complete.

Once the wrapping is done, the foot should be held either on the hoof stand or farrier fashion until the cured product is hard to the touch. This customarily takes less than five minutes. At this time, the foot is held between the operator's legs, and the material is cut with a sharp hoof knife to remove excess material from the weight bearing surface. As shown in FIG. 8, the center of the windings across the sole is cut away in the interior area 44 of the shoe. The cured resin material is left in the form of a bar 46 extending between the open ends of the shoe in the heel area. Material is also left overlapping the shoe about ⅜ of an inch. The foot is placed on a smooth, clean hard floor and movement is discouraged for 20–30 minutes. The time for restricting movement is determined by feeling the repair and noting normal temperature, absence of wetness and tackiness, hardness of finish, and total adhesion of edges of successive layers of fiberglass.

The method provides a superior securing of the shoe to the cracked hoof. The shoe is secured by the cured resin sheet material which is actually adhesively bonded to the hoof to provide a superior securing of the shoe to the hoof. The encased shoe immobilizes and stabilizes the hoof wall structure to allow the hoof to grow out solidly from the coronet. The present invention should be reapplied in an ongoing treatment every 4–6 weeks until the defect has grown out solidly from the coronet to a point where conventional methods may be employed for applying a shoe to a hoof. However, as will be discussed below, the present method of wrapping curable resin coated sheet material around a hoof and shoe can be applied in situations for the securing of a shoe to a normal hoof, or to a hoof which is weak or in poor condition even without a defined crack.

Figure 9:
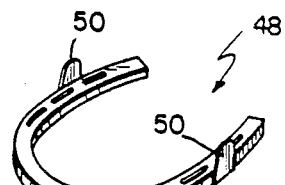
FIG. 9 is a schematic view of a shoe according to certain preferred embodiments which includes side anchors for winding the curable resin coated sheet material around.
Figure 10:
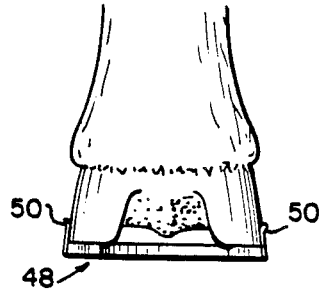
FIG. 10 is a schematic view of the horseshoe of FIG. 9 applied to a hoof.

According to other preferred embodiments, a shoe 48 is shown in FIG. 9. This shoe includes anchor extensions 50 which can extend out from the side wall of the hoof as shown in FIG. 10. The curable resin coated sheet material can be wound around the anchor elements 50 of the shoe, further increasing the securing of the shoe to the hoof.

Certain hooves are in poor condition or weak, and easily lose shoes which are applied and secured to the hoof using conventional methods such as clips or nails. On these hooves, shoes can be applied using the methods discussed above and of course deleting the steps specifically needed for repairing cracks in the hoof before applying the shoe. Standard shoes can be applied using the present invention method discussed above, or the shoes including anchor elements 50 shown in FIGS. 9 and 10 can be used. It has been discovered that hooves having shoes secured by the resin coated sheet material tend to grow at a faster rate with a denser consistency than hooves in poor condition which are left uncovered.

Figure 11:
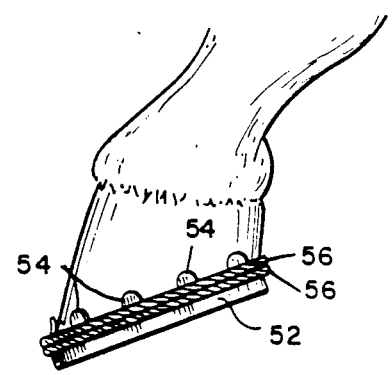
FIG. 11 is a schematic side view of a molded shoe according to certain preferred embodiments which is applied and secured to the hoof.

According to other preferred embodiments, a shoe can be molded from the same curable resin coated sheet material as that used above to secure conventional shoes to the hoof of an animal. The shoe-shaped woven resin coated fiberglass mat can then be water activated and molded to the hoof and allowed to set in place. FIG. 11 illustrates the application of such a molded shoe 52 to a hoof. Bands of plastic 54 would be incorporated into the mold and adhered to the hoof wall with resin impregnated fiberglass rope or cord 56 wrapped over the plastic around the hoof, ascending to within a one-third distance to the coronet.

According to other advantageous embodiments, third phalanx fractures can be healed using shoes with clips and bars in order to provide immobilization and stabilization of the foot and fracture. The application of the shoe and the resin sheet material, as discussed above with weak hooves, is much superior to customary securing of the shoe only.

According to other advantageous embodiments, the resin fiberglass sheet material can be used to substantially reduce the contamination commonly associated with the hoof of the animal. As discussed above, even if thoroughly cleaned and wrapped in antibacterial impregnated dressing overnight, and scrubbed again before surgery, the hoof is still a common source of bacterial contamination. Thus, prior to surgery, the hoof can be wrapped with the fiberglass sheet material which will provide an impervious shield over the hoof to help reduce or eliminate contamination from the hoof during surgery.

Figure 12A:
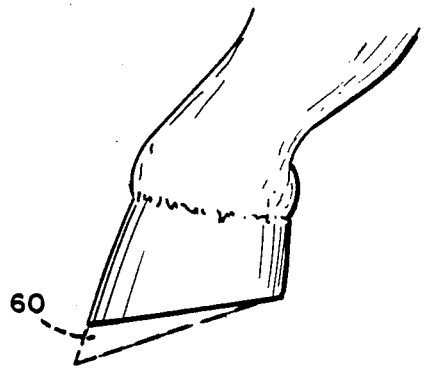
FIGS. 12a and 12b are schematic side views of certain preferred embodiments of the invention used in reshaping the hoof.
Figure 12B:
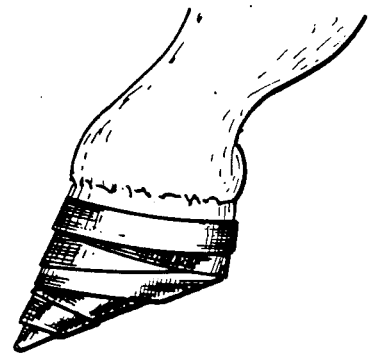

Another application of the cured resin sheet material is shown in FIGS. 12a and 12b, in these embodiments, the hoof is remodeled or reshaped so as to add length to modify the center of weight-bearing; e.g., in building up the toe to aid in contracted tendon correction; or so as to wedge the medial or lateral hoof wall to correct toe-in/toe-out related deformities. In these instances, it is contemplated to provide the elevations by shaping material such as by layering of the resin sheet, or by providing elevations of stacked layers of solid sheets of material such as tongue-depressors into the wrappings. FIG. 12a schematically shows the shaping material 60 applied to the hoof, and FIG. 12b shows the wrapped hoof incorporating the shaping material.

While several embodiments in accordance with the present invention have been shown and described, it is understood that the same is not limited thereto, but is susceptible to numerous changes and modifications as known to one having ordinary skill in the art, and therefore the present invention should not be limited to the detail shown and described herein, but should cover all such modifications as are encompassed by the scope of the appended claims.

I claim:

1. Method for securing a horseshoe to a hoof comprising:
    applying a horseshoe to the bottom of a hoof;
    initiating the cure of curable resin coated sheet means having an elongated tape configuration; and 'winding the curable resin coated sheet means around at least a portion of the bottom of the applied horseshoe and at least a portion of the side of the hoof after initiation of cure such that the cured resin coated sheet means secures the horseshoe to the hoof.

2. Method as in claim 1, wherein said applying of said horseshoe includes attaching said horseshoe to the hoof using attaching means for preventing movement of the horseshoe relative to the hoof before and during said wrapping and said curing of said curable resin coated sheet means.

3. Method as in claim 2, wherein said attaching includes nailing said horseshoe to the hoof.

4. Method as in claim 2, wherein said applying of said horseshoe includes using a horseshoe having anchor means extending out from side walls of the hoof for anchoring the curable resin coated sheet means wrapped around the horseshoe and the hoof.

5. Method as in claim 2, wherein said curable resin coated sheet means adheres to the hoof when cured.

6. Horseshoe securing assembly comprising:
    a horseshoe applied to the bottom of a hoof; and
    cured resin coated sheet means having an elongated tape configuration wound around at least a portion of the bottom of said horseshoe and around at least a portion of the side of and adhered to the hoof such that the horseshoe is secured to the hoof.

7. Assembly as in claim 6, further including nails attaching said horseshoe to the hoof.

8. Method for reducing contamination during surgery of a hoofed animal comprising:
    initiating the cure of curable resin coated sheet means having an elongated tape configuration; and
    winding the curable resin coated sheet means around a portion of at least the bottom and the side of a hoof prior to surgery such that the cured resin coated sheet means forms a contamination shield over the hoof.

9. Method as in claim 8, wherein said wrapping of the curable resin coated sheet means around the hoof adheres the resin coated sheet means to the hoof when cured, thereby creating said contamination shield over the hoof.

10. Method for shaping a hoof of an animal comprising:
    attaching shaping means to the hoof;
    initiating the cure of curable resin coated sheet means having an elongated tape configuration;
    winding the curable resin coated sheet means around at least a portion of the bottom and side of the hoof and around the shaping means after initiation of cure thereby adding shaping to the hoof.

11. Method for shaping a hoof of an animal comprising:
    initiating the cure of curable resin control sheet means having an elongated tape configuration; and
    winding the curable resin control sheet means around at least a portion of the bottom and the side of the hoof after initiation of cure to add shaping to the hoof.

* * * * *